United States Patent [19]

Ohashi et al.

[11] 4,292,353
[45] Sep. 29, 1981

[54] URETHANE MODIFIED POLYISOCYANURATE FOAM SURFACED WITH ALUMINUM FOIL OR SHEET

[75] Inventors: Takashi Ohashi, Iruma; Toru Okuyama, Sagamihara; Akira Suzuki, Hidaka; Katsuhiko Arai, Higashimurayama; Minoru Kojima, Ohme; Yoshiko Taniguchi, Higashimurayama; Masako Yoshida, Kodaira; Ryozo Sakata, Higashiyamato; Hideki Sugihara, Miura-Gun; Masashi Dobashi, Yokohama; Hirobumi Ohwada, Kamakura, all of Japan

[73] Assignee: Bridgestone Tire Co., Ltd., Tokyo, Japan

[21] Appl. No.: 959,811

[22] Filed: Nov. 13, 1978

[30] Foreign Application Priority Data

Nov. 14, 1977 [JP] Japan .................... 52-135614

[51] Int. Cl.³ .............................. B32B 5/20
[52] U.S. Cl. .................... 428/211; 428/215; 428/313; 428/332; 428/422.8; 428/464; 428/920
[58] Field of Search ............... 521/125, 902; 428/311, 428/313, 315, 464, 422.8, 211, 195, 215, 216, 332, 920

[56] References Cited

U.S. PATENT DOCUMENTS

| | | | |
|---|---|---|---|
| 3,654,067 | 4/1972 | Klein | 428/464 |
| 3,814,659 | 6/1974 | Nadean | 428/313 |
| 3,847,724 | 11/1974 | Powers et al. | 428/322 |
| 3,903,346 | 9/1975 | De Leon et al. | 156/79 |
| 3,940,517 | 2/1976 | De Leon | 521/125 |
| 4,025,687 | 5/1977 | Wooler et al. | 428/422.8 |
| 4,067,833 | 1/1978 | Austin et al. | 521/125 |
| 4,118,533 | 10/1978 | Hipchen et al. | 156/79 |
| 4,121,958 | 10/1978 | Koonts | 428/314 |
| 4,131,518 | 12/1978 | Fromson | 428/464 |
| 4,148,980 | 4/1979 | Narayan | 521/902 |
| 4,165,414 | 8/1979 | Narayan et al. | 521/902 |
| 4,166,164 | 8/1979 | Cenker et al. | 521/902 |
| 4,212,917 | 7/1980 | Skowronski et al. | 521/902 |

FOREIGN PATENT DOCUMENTS 2253890 7/1975 France .................. 428/313

*Primary Examiner*—William J. Van Balen
*Attorney, Agent, or Firm*—Sughrue, Mion, Zinn, Macpeak and Seas

[57] ABSTRACT

A laminate having excellent flameproofing and low-smoke development is disclosed. The laminate comprises an urethane modified polyisocyanurate foam as a core material and an aluminum foil or sheet as a surface material piled on at least one surface of the foam through a self-adhesion of the foam and passes Grade 2 incombustibility according to Japanese Industrial Standard (JIS) A-1321 combustion test.

13 Claims, No Drawings

URETHANE MODIFIED POLYISOCYANURATE FOAM SURFACED WITH ALUMINUM FOIL OR SHEET

The present invention relates to laminates containing an urethane modified polyisocyanurate foam as a core material and having excellent flameproofing and low-smoke development. More particularly, the present invention relates to flameproof and low-smoking laminates obtained by piling an urethane modified polyisocyanurate foam, which is obtained by using a polyether polyol having a defined molecular weight with a defined modifying ratio as a polyol in the presence of an alkali metal salt of carboxylic acid or a combination with a tertiary amino compound as an isocyanate trimerization catalyst, with one or more of aluminum foil or sheet having a defined thickness through a self-adhesion of the foam.

The laminates according to the present invention contain the core material composed of the urethane modified polyisocyanurate foam as described above and are characterized by having a fireproof property passed Grade 2 incombustibility (quasi-incombustible material) in a test for incombustibility of internal finish material of buildings according to Japanese Industrial Standard (JIS) A-1321.

As the building materials such as ceiling material, wall material and others, there have hitherto been used ones obtained by using woody part, gypsum or the like as a core material and piling a decorative paper, iron plate or surface material thereon through an adhesive. However, such building materials are large in the specific gravity and heavy in the weight, so that they have such drawbacks that the processability is poor, the thermal insulating property is low and the hygroscopicity and dimensional stability change considerably with time.

Recently, there have been proposed building materials manufactured by using a foamable isocyanate resin for rigid polyurethane foam, polyisocyanurate foam or the like as a substrate, admixing or filling the foamable resin layer with a great amount of a flame retardant, a smoke-suppressing agent, inorganic granules or the like or reinforcing the layer with a glass fiber mat and laminating such a reinforced foam as a core material with a relatively thick steel plate such as colored iron plate and the like as a surface material in view of the thermal insulating property and weight-saving, a few of which are known as a so-called incombustible building panel. These panels require the weight-saving and the easiness of the processability as far as possible when using as an internal finish material for housing, building and the like, so that the use of steel plate as the surface material is unsuitable. Further, when these laminates are used as the building material, they are required to pass each of standard values of incombustibility, smoke development, toxicity of combustion gases and the like defined by the building regulation. According to JIS A-1321 "Testing method for incombustibility of internal finish material and procedure of buildings" in the recently revised building regulation, the laminates each composed of the core material and the surface material for use in the ceiling material, wall material or the like were subjected to annexed test and smoke test under severe conditions as well as the conventional surface test in order to examine whether or not they pass Grade 2 incombustibility. As a result, there were come out that the greater part of laminates passes the conventional surface test but does not pass the annexed test. Therefore, it is desired to develop laminates passing both the surface test and the annexed test with respect to the fireproof property.

Under the above circumstances, the inventors have made various studies with respect to the development of building materials having a light weight, a good heat insulating property and a fireproof property of Grade 2 incombustibility and have found out a surprising phenomenon as mentioned below and as a result, the present invention has been accomplished. That is, it has been confirmed that when an urethane modified polyisocyanurate form as a core material, which is obtained by using a polyether polyol having a defined molecular weight in a defined modifying ratio in the presence of a specified isocyanate trimerization catalyst without adding a flame retardant and a smoke-suppressing agent, is piled with one or more of aluminum foil or sheet having a defined thickness as a surface material through a self-adhesion of the foam, the resulting laminate passes the surface test and annexed test according to JIS A-1321 examining the fireproof property of Grade 2 incombustibility. Moreover, the urethane modified polyisocyanurate foam used as the core material in the present invention itself does not pass Grade 2 incombustibility, while the aluminum foil or sheet with the defined thickness used as the surface material in the present invention itself has a fireproof property to an extent of causing a fusion when it is heated under test conditions for Grade 2 incombustibility. Therefore, it can be said unexpectedly and surprisingly that the laminate composed of such core material and surface material has a fireproof property as the quasi-incombustible material passing the surface test and annexed test under test conditions for Grade 2 incombustibility.

The polyisocyanurate foam is a material of a high utility value for use in thermal insulating materials, various building materials, construction materials and the like because it has a thermal insulating property substantially equal to that of a polyurethane foam and excellent flameproofing and thermal resistance as compared with the polyurethane foam and is good in the processability. In order to ensure the fireproof property as the quasi-incombustible material by combining the polyisocyanurate foam having the above mentioned excellent properties as the core material with any kind of surface materials, however, it is considered that the polyisocyanurate foam itself is improved so as to have a fireproof property as a quasi-incombustible material and further is combined with the surface material having a fireproof property of incombustible to quasi-incombustible grade. For this end, there is a tendency of earnestly studing various modifications, composition and the like of the polyisocyanurate foam by those skilled in the art. In this connection, the inventors have already proposed a process for the production of polyisocyanurate foam having a fireproof property of Grade 2 incombustibility (Japanese patent Application No. 39,970/77 and Japanese patent application publication No. 35,400/77). On the other hand, the feature that the laminate according to the present invention, which is obtained by the combination of the polyisocyanurate foam as the core material and the aluminum foil or sheet as the surface material each having no fireproof property of Grade 2 incombustibility alone, satisfies the fireproof property of Grade 2 incombustibility as the quasi-incombustible material is entirely unexpected in the tendency of technical development as described above. Further, the present invention provides an effective process for the manufacture of the laminated in viewpoint of economy because the laminate having a high degree of incombustibility and a fireproof property as a quasi-incombustible material of a very low-smoke development during the combustion can easily be produced by using the urethane modified polyisocyanurate foam as the core material without adding the flame retardant, smoke-suppressing agent and the like.

It is, therefore, an object of the present invention to provide a laminate usable for building materials, which is light in weight and good in processability and has a fireproof property of Grade 2 incombustibility according to JIS A-1321 combustion test.

According to the present invention, there is a provision of a laminate comprising an urethane modified polyisocyanurate foam as a core material and an aluminum foil or sheet having a thickness of not less than 0.1 mm as a surface material; the urethane modified polyisocyanurate foam being obtained by reacting an organic polyisocyanate, a polyol, a blowing agent, an isocyanate trimerization catalyst and, if necessary, a surfactant, a modifying agent and other additives, i.e. by reacting an organic polyisocyanate with a polyether polyol having a hydroxyl equivalent of 200 to 2,000 in the presence of 0.05 to 0.13 equivalent amount per isocyanate group of the isocyanate trimerization catalyst composed of an alkali metal salt of a carboxylic acid with a carbon number of 2 to 12 alone or a combination with a tertiary amino compound; the core material being piled on at least one surface thereof with the surface material through a self-adhesion of the polyisocyanurate foam during the foaming.

In general, polyisocyanurate foam substantially indicates an urethane modified polyisocyanurate foam because unmodified foams have a series disadvantage of bursting. When these foams are exposed to flame or high temperature, they burst into fragments like popcorn. Such a modification is a necessary means for solving the aforementioned drawbacks and improving the adhesion property to the surface material and the like though it deteriorates the incombustibility, thermal resistance and smoke development. Therefore, it is desired to develop a modification method of satisfying both the inconsistent conditions as described above.

When the urethane modified polyisocyanurate foam is used as a core material, the foam itself does not pass Grade 2 incombustibility of the fireproof property. According to the present invention, it has been found that in order to develop peculiar flameproofing and low-smoke development in a laminate obtained by combining such a foam with a surface material, it is necessary to restrict the urethane modification and catalyst system in the formation of the foam. That is, when a polyether polyol having a relatively high molecular weight is used in a relatively low modifying ratio in the presence of a catalyst having a great effect for accelerating trimerization of isocyanate, there is obtained an urethane modified polyisocyanurate foam mitigating explosive crack and crack initiation and improving a self-adhesion to a surface material and exhibiting remarkable flameproofing and low-smoke develoment when forming into a laminate. This fact is an unexpected result which has never been anticipated from the prior art.

According to the present invention, the organic polyisocyanate means an organic compound having two or more isocyanate groups in one molecule and includes aliphatic polyisocyanates, aromatic polyisocyanates, mixtures and modified substances thereof.

As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), dianisidine diisocyanate, xylylene diisocyanste, tris(isocyanate phenyl) thiophosphate, polynuclear polyisocyanate having the following formula

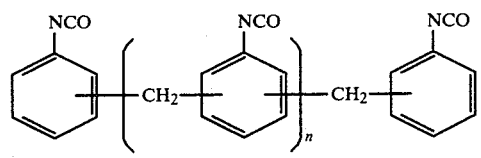

(so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polynuclear aromatic polyisocyanates are preferable in view of flameproofing and thermal resistance.

The polyol to be used in the present invention is a compound having two or more hydroxyl groups at its terminal, which may be used alone or in admixture of two or more compounds. As the polyol, mention may be made of an addition product of a polyhydric alcohol such as ethylene glycol, propylene glycol, butylene glycol, hexylene glycol, glycerine, hexane triol, pentaerythritol, trimethylol propane, methyl glucoside, sorbitol, sucrose or the like with an alkylene oxide; an addition product of an alkanol amine such as diethanol amine, triethanol amine or the like with an alkylene oxide; an addition product of a polyamine such as ammonia, ethylene diamine, diethylene triamine, tolylene diamine or the like with an alkylene oxide; a phosphor containing polyol such as an addition product of phosphoric acid with alkylene oxide and the like; an addition product of a phenol such as bisphenol A or the like with an alkylene oxide; an addition product of an intermediate having a phenolic hydroxyl group such as novolac resin, resol resin or the like with an alkylene oxide and so on. Furthermore, a mixture of the above mentioned polyhydric alcohol and polyether polyol may be used as the polyol.

In order to produce a laminate having improved flameproofing and low-smoke development and a good self-adhesion to a surface material, the polyol should have a hydroxyl equivalent of 200 to 2,000 as a molecular weight and an urethane modifying ratio of 0.05 to 0.13 equivalent per isocyanate group of an organic polyisocyanate to be used. When the hydroxyl equivalent of the polyol is less than 200, the resulting urethane modified polyisocyanurate foam has a tendency of deteriorating the friability and is poor in the initial self-adhesion to the surface material and has no fireproof property of quasi-incombustible material as a laminate.. When the hydroxyl equivalent exceeds 2,000 even if the predetermined urethane modifying ratio is adopted, the amount of polyol used considerably increases and the flameproofing is deteriorated. Similarly, when the urethane modifying ratio of the polyol is beyond the above defined range, the friability or flameproofing is deteriorated and the fireproof property of the quasi-incombustible material is hardly held in case of the laminate.

According to the present invention, an alkali metal salt of carboxylic acid with a carbon number of 2 to 12 or a combination with a tertiary amino compound is used as an isocyanate trimerization catalyst. For instance, the alkali metal salt of carboxylic acid includes potassium acetate, potassium propionate, potassium caprylate, potassium 2-ethyl hexanoate, potassium adipate, sodium benzoate and the like. Such a trimerization catalysts may be used as a mixture thereof. A preferred catalyst is potassium acetate, potassium caprylate or the like in view of a catalytic activity, a compatibility with the polyol and the like.

As the tertiary amino compound used together with the alkali metal salt of carboxylic acid, mention may be made of N,N',N''-tris(dialkylaminoalkyl)-sym-hexahydrotriazine, 2,4,6-tris(dimethylaminomethyl) phenol, 1,8-diaza-bicyclo(5,4,0) undecene-7, triethylamine, dimethylethanol amine, triethylenediamine, tetramethyl ethylenediamine and the like. If the tertiary amino compound is used alone as the catalyst, a great amount of the compound is required in view of the catalytic activity and hence the effect of accelerating the formation of urethane is preferential. As a result, the resulting urethane modified polyisocyanurate foam itself causes a shrinkage phenomenon and has a tendency of increasing the density and is poor in the flameproofing. Therefore, when the foam is used as a core material of a laminate, it has been confirmed that the laminate does not provide the fireproof property as the quasi-incombustible material. However, when the tertiary amino compound is used together with the alkali metal salt of carboxylic acid as described above, there is no trouble, rather the friability, self-adhesion property and the like of the urethane modified polyisocyanurate foam are improved to a certain extent, so that the laminates passing Grade 2 incombustibility can be produced without deteriorating the fireproof property. The amount of the trimerization catalyst used is 0.5 to 10% by weight of the organic polyisocyanate.

According to the present invention, all of blowing agents used in the production of polyurethane foam and polyisocyanurate foam may be used. For instance, the blowing agent includes carbon dioxide gas generated by adding water to the reaction mixture or supplied from an exterior source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethne is preferable as the blowing agent in view of properties of the foam, easiness of expansion and the like. The addition amount of the blowing agent influences the density of the resulting urethane modified polyisocyanurate foam, but it is usually 5 to 50% by weight of the foam forming composition.

In addition to the above mentioned ingredients, a surfactant, a modifying agent and other additives may be added, if necessary.

As the surfactant, use may be made of any ones usually used in the production of polyurethane foam, an example of which includes an organosilicone surfactant such as organopolysiloxane-polyoxyalkylene copolymer, polyalkylene siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01 to 5 parts by weight per 100 parts by weight of the organic polyisocyanate.

As the additive, there are inorganic hollow particles, granulated refractory, fibrous materials, inorganic fillers and the like, which are used for improving the properties of the foam such as hardness and the like. The inorganic filler includes mica powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the present invention. According to the present invention, the flame retardant usually used in the polyurethane foam and urethane modified polyisocyanurate foam is effective and includes halogenated organic phosphorous compounds such as tris(chloroethyl) phosphate, tris(dichloropropyl) phosphate, tris(dibromopropyl) phosphate and the like; and inorganic flame retardants such as antimony oxide, aluminum trihydroxide and the like.

A surface material to be piled on the urethane modified polyisocyanurate foam as the core material is an aluminum foil or sheet having a thickness of not less than 0.1 mm. As the surface material piled on at least one surface of the core material, it is necessary to use the aluminum foil or sheet having a thickness of not less than 0.1 mm. When the thickness of the surfce material is less than 0.1 mm, the laminate cannot sustain Grade 2 incombustibility as the fireproof property. While, the surface material to be piled on another surface of the core material does not necessarily have a thickness of not less than 0.1 mm. When using the surface material having a thickness of not less than 0.1 mm, the fireproof property is improved with the increase of the thickness, but the processability and economical reason are apt to be deteriorated, so that it is preferable that the thickness of the surface material is about 0.1 to 0.2 mm in view of practical use. Moreover, the surface material may be subjected to various coatings or decorations without damaging the fireproof property, if necessary or fabrications previously subjected to the coating or decoration may be used as the surface material.

The reason why the laminate according to the present invention develops the excellent flameproofing and low-smoke development as Grade 2 incombustibility is guessed as follows. That is, when the laminate composed of the combination of the urethane modified polyisocyanurate foam as the core material with the aluminum foil or sheet as the surface material according to the present invention is heated in the surface test, a slight space is produced between the core material and the surface material due to the generation of gas by the thermal decomposition of the core material and at the same time, the surface material is liable to be bulged to a certain extent, whereby the heat from a fire source is dissipated. From this fact, it is apparent that even if the surface material itself is fused by the heating, when the surface material is piled on the core material to form a laminate, the fusion of the surface material is prevented and as a result, the combustion of the core material is suppressed. Furthermore, when the laminate according to the present invention is subjected to an annexed test, there is no accumulation of decomposition gas between the core material and the surface material, so that the surface material is fused without bulging. In the latter case, it is considered that the combustion of the core material is suppressed through the fusion phenomenon of the surface material by the effect of combining the core material with the surface material. On the contrary, when the colored iron plate is used as the surface material according to the prior art, since the surface material itself does not fuse, the resulting laminate passes the surface test but does not pass the annexed test in the smoke development due to the incomplete combustion of the core material. That is, the laminates of the prior art do not satisfy the standard values passing both surface and annexed tests.

According to the present invention, the laminate containing the urethane modified polyisocyanurate foam as a core material is usually manufactured as follows. That is, the polyol as an urethane modifying agent, catalyst and blowing agent are mixed with stirring by adding a foam stabilizer and other additives, if necessary, to form a homogeneous solution, to which is added the organic polyisocyanate with stirring, whereby a cream-like reaction mixture is obtained. Then, the reaction mixture is foamed in a space defined by two metal plates as a surface material so as to form a laminate of a predetermined thickness and bonded thereto through the self-adhesion of the resulting polyisocyanurate foam. Moreover, the polyisocyanurate foam may be bonded to the surface material with an adhesive without damaging the fireproof property. In the latter case, a great care must be taken in the selection of the adhesive.

As mentioned above, light laminates having improved thermal insulating property and flameproofing and low-smoke development according to the present invention has a fireproof property passing Grade 2 incombustibility according to JIS A-1321 combustion test. Therefore, the laminates according to the present invention are usable as various building materials for housing, building and the like.

The following examples are given in illustration of the present invention with comparative examples and reference examples and are not intended as limitations thereof. In the examples, all parts and percentages are by weight, unless otherwise stated.

Moreover, the effect of the present invention is decided on a basis of whether or not the laminate passes Grade 2 incombustibility according to JIS A-1321 combustion test. The surface test according to JIS A-1321 is carried out by placing a test piece with a length, width and thickness of 22 cm × 22 cm × 1.5 ~ 2.5 cm in a heating furnace and then heating a surface of the test piece for a predetermined period using gas as a sub-heat source and an electric heater as a main heat source. Thereafter, the presence and degree of crack/deformation, time of lingering flame after the completion of heating, heat release value (temperature time area, °C.×min.) calculated from the difference between the exhaust temperature curve of the test piece and the reference curve of perlite plate as a basic material, and fuming factor calculated from maximum fuming quantity are measured to judge the fireproof property of the laminate on a basis of acceptable standard values shown in the following Table 1. The annexed test of the laminate is carried out under the same conditions as described above, except that three holes of 25 mm diameter are pierced from front of the test piece to rear side thereof in place. In this case, the evaluation of the term "crack/deformation" is omitted.

TABLE 1

Test
Acceptable standard values of Grade 2
incombustibility (quasi-incombustible material)
according to JIS A-1321 combustion test

| Class | Item Heat release value (°C. × min.) | Fuming factor | Time of lingering flame (sec.) | Crack/ deformation |
|---|---|---|---|---|
| Surface test | not more than 100 | not more than 60 | not more than 30 | no harmful degree |
| Annexed test | not more than 150 | not more than 60 | not more than 90 | — |

EXAMPLES 1-4, REFERENCE EXAMPLE 1, COMPARATIVE EXAMPLE 1

(1) Compounding recipe of urethane modified polyisocyanurate foam

TABLE 2

| Ingredients | Parts by weight |
|---|---|
| Crude diphenylmethane diisocyanate (1) | 100 |
| Polypropylene glycol (2) | 13.97 |
| Solution of 33 wt. % potassium acetate in dipropylene glycol (3) | 4.0 |
| N, N', N''-tris(dimethylaminopropyl)- sym-hexahydrotriazine (4) | 0.5 |
| Trichloromonofluoromethane (5) | 25 |
| An urethane modifying ratio for isocyanate group is 0.083. | |

Note
(1) Coronate 47 (trade name) made by Nippon Polyurethane Co. Ltd.; isocyanate equivalent = 137
(2) PP-2000 (trade name) made by Sanyo Kasei Co., Ltd.; hydroxyl equiivlent = 1,000
(3) The solution is abbreviated as AcOK/DPG herinafter.
(4) Polycat 41 (trade name) made by Abbott Laboratories, hereinafter abbreviated as P-41.
(5) The compound is abbreviated as F-11 hereinafter.

(2) Productions of urethane modified polyisocyanurate foam and laminate

An urethane modifier polyisocyanurate foam was made from the compounding recipe of Table 2 and a laminate having a total thickness of 2.5 cm was manufactured by using the foam as a core material and an aluminum foil of sheet having a different thickness as a surface material and bonding both the materials through a self-adhesion of the foam.

The production of the foam and laminate was carried out on a scale of 300 g of the organic polyisocyanate as follows.

That is, the ingredients other than the organic polyisocyanate were weighed in a polyethylene beaker of 1 l capacity and thoroughly mixed to form a homogeneous mixed solution. To this solution was added the organic polyisocyanate weighed in another stainless beaker of 0.5 l capacity, and the resulting foam forming composition was immediately stirred at a high speed for about 6 seconds. Then, the composition was poured into a wooden mold of 35 cm of length and width each, foamed and gelled at room temperature to form the urethane modified polyisocyanurate foam.

In an aluminum mold of 40 cm of length and width each was placed an aluminum foil or sheet having approximately the same size as a surface material and then the mold was heated up to about 38° C. in an oven. Separately, a foam forming composition was prepared starting from the compounding recipe of Table 2 in the same manner as described above and left to stand for about 12 seconds to form a cream-like and viscous solution, which was cast into the mold. Then, the mold was tightly covered with an upper aluminum cover having an aluminum foil or sheet as another surface material at its inner surface (the use of only the upper cover in Example 2) through a spacer giving a predetermined laminate thickness and pressed up to an extent withstanding a foaming pressure. Thereafter, the curing was carried out in an oven at a temperature of about 50° C. for 15 minutes and then the resulting laminate was taken out from the mold.

The urethane modified polyisocyanurate foam and laminates containing such foam as the core material were examined according to JIS A-1321 combustion test to obtain results relating to the fireproof property of Grade 2 incombustibility as shown in the following Table 3. In this case, only the surface test was made with respect to the foam and both the surface and annexed tests were made with respect to the laminate. As seen from the data of Table 3, the fireproof property of the foam itself does not reach Grade 2 incombustibility, but it is obvious that the laminate obtained by piling the aluminum foil or sheet having a thickness of not less than 0.1 mm on at least one surface of the foam as the core material has a fireproof property of Grade 2 incombustibility.

TABLE 3

| | | Reference example 1 | Comparative example 1 | | Example 1 | | Example 2 | | Example 3 | | Example 4 | |
|---|---|---|---|---|---|---|---|---|---|---|---|---|
| Thickness of surface material (mm) | | — | 0.05 | | 0.10 | | 0.12 | | 0.15 | | 0.02 | |
| JIS A-1321 Combustion test | Class | Surface test | Surface test | Annexed test | Surface test | Annexed test | Surface test | Annexed test | Surface test | Annexed test | Surface test | Annexed test |
| | Heat release value (°C. × min.) | 213.8 | 38.8 | 28.8 | 0 | 0 | 0 | 0 | 0 | 0 | 0 | 0 |
| | Fuming factor | 42.3 | 71.7 | 45.0 | 1.2 | 38.4 | 0.6 | 38.7 | 0 | 34.2 | 1.5 | 38.4 |
| | Time of lingering flame (sec.) | 6 | 45.0 | 33 | 0 | 29 | 0 | 29 | 0 | 25 | 0 | 33 |
| | Crack/ deformation | none/ medium | none/ small | — | none/ small | — | none/ small | — | none/ small | — | none/ small | — |
| | Judgement | unacceptable | unacceptable | | acceptable | | acceptable | | acceptable | | acceptable | |

EXAMPLES 5–8, REFERENCE EXAMPLES 2–7, COMPARATIVE EXAMPLES 2–3

The urethane modified polyisocyanurate foam and laminate containing the foam as the core material were manufactured in the same manner as described in Example 3 and Reference example 1 by varying the kind and amount of the isocyanate trimerization catalyst. In the following Table 4 are shown the compounding recipe and evaluation results relating to the fireproof property of Grade 2 incombustibility with respect to the foam and laminate.

TABLE 4(a)

| | | Reference example 2 | Example 5 | | Reference example 3 | Example 6 | | Reference example 4 | Example 7 | |
|---|---|---|---|---|---|---|---|---|---|---|
| Isocyanate trimerization catalyst | | AcOK/DPG | | | OcOK/DPG (1) | | | OcOK/DPG/DMEA (2) | | |
| Amount of catalyst (parts by weight) | | | 4.0 | | | 4.0 | | | 4.0/0.5 | |
| Thickness of surface material (mm) | | — | 0.15 | | — | 0.15 | | — | 0.15 | |
| JIS-A-1321 Combustion test | Class | Surface test | Surface test | Annexed test | Surface test | Surface test | Annexed test | Surface test | Surface test | Annexed test |
| | Heat release value (°C. × min.) | 257.50 | 0 | 0 | 255.0 | 0 | 0 | 195.0 | 0 | 0 |
| | Fuming factor | 51.0 | 0.6 | 31.8 | 40.2 | 0.6 | 46.5 | 55.2 | 0.6 | 38.1 |
| | Time of lingering flame (sec.) | 0 | 0 | 35 | 0 | 0 | 26 | 0 | 0 | 29 |
| | Crack/ deformation | small/ small-medium | none/ small | — | none/ small-medium | none/ small | — | small/ medium | none/ small | — |
| | Judgement | unacceptable | acceptable | | unacceptable | acceptable | | unacceptable | acceptable | |

TABLE 4(b)

| | Reference example 5 | Example 8 | | Reference example 6 | Comparative example 2 | | Reference example 7 | Comparative example 3 | |
|---|---|---|---|---|---|---|---|---|---|
| Isocyanate trimerization catalyst | AcOK/DPG/DMP-30 (3) | | | DMP-30 | | | P-41 | | |
| Amount of catalyst (parts by weight) | 4.0/0.5 | | | 8.0 | | | 5.0 | | |
| Thickness of surface material (mm) | — | 0.15 | | — | 0.15 | | — | 0.15 | |
| JIS-A-1321 Combustion test  Class | Surface test | Surface test | Annexed test | Surface test | Surface test | Annexed test | Surface test | Surface test | Annexed test |
| Heat release Value (°C. × min.) | 233.8 | 0 | 0 | 221.3 | 71.3 | 332.5 | 151.3 | 196.3 | 260 |
| Fuming factor | 30.0 | 0 | 37.2 | 76.5 | 159 | 132 | 93.0 | 147 | 90.6 |
| Time of lingering flame (sec.) | 0 | 0 | 30 | 0 | 174 | 95 | 25 | 37 | 68 |
| Crack/deformation | none/small-medium | none/small | — | none/small | presence/large | — | none/small | none/large | — |
| Judgement | unacceptable | acceptable | | unacceptable | unacceptable | | unacceptable | unacceptable | |

None
(1): OcOK/DPG: solution of 33% potassium caprylate in dipropylene glycol
(2): DMEA: N,N-dimethyl ethanolamine
(3): DMP-30: 2,4,6-tris(dimethylaminomethyl) phenol, made by Rohm & Haas Co.

EXAMPLES 9–14, REFERENCE EXAMPLES 8–15, COMPARATIVE EXAMPLES 4–5

The urethane modified polyisocyanurate foam and laminate containing the foam as a core material were manufactured in the same manner as described in Example 3 and Reference example 1, except that various polyols were used alone or in admixture thereof. In the following Table 5 are shown compounding recipe of ingredients and evaluation results relating to the fireproof property of Grade 2 incombustibility with respect to the foam and laminate. In this table, the amount of the ingredient used is expressed on a basis of 100 parts by weight of the organic polyisocyanate.

TABLE 5(a)

| | | Reference example 8 | Example 9 | | Reference example 9 | Example 10 | | Reference example 10 | Example 11 | |
|---|---|---|---|---|---|---|---|---|---|---|
| Polyether polyol | Kind | PP-750(1) | | | PP-400(2) | | | FA-702(3) | | |
| | Hydroxyl equivalent | 360 | | | 200 | | | 1,480 | | |
| | Amount (parts) | 12.95 | | | 12.48 | | | 13.61 | | |
| Surfactant | Kind | SH-193 (8) | | | SH-193 | | | — | | |
| | Amount (parts) | 1.0 | | | 1.0 | | | — | | |
| Modifying ratio* | | 0.111 | | | 0.125 | | | 0.077 | | |
| Thickness of surface material (mm) | | — | 0.15 | | — | 0.15 | | — | 0.15 | |
| JIS A-1321 Combustion test  Class | | Surface test | Surface test | Annexed test | Surface test | Surface test | Annexed test | Surface test | Surface test | Annexed test |
| Heat release value (°C. × min.) | | 185.0 | 0 | 0 | 206.3 | 0 | 0 | 231.3 | 0 | 0 |
| Fuming factor | | 77.0 | 1.5 | 53.1 | 44.7 | 1.8 | 40.2 | 26.7 | 0.9 | 49.8 |
| Time of lingering flame (sec.) | | 60 | 0 | 28 | 73 | 0 | 51 | 0 | 0 | 56 |
| Crack/deformation | | none/medium | none/medium | — | presence/medium | none/medium | — | presence/small-medium | none/medium | — |
| Judgement | | unacceotable | acceptable | | unacceptable | acceptable | | unacceptable | acceptable | |

TABLE 5(b)

| | | Reference example 11 | Example 12 | | Reference example 12 | Example 13 | | Reference example 13 | Example 14 | |
|---|---|---|---|---|---|---|---|---|---|---|
| Polyether polyol | Kind | GP-3000(4) | | | PP-2000/PTG(5) | | | ACTCOL 32-160(6) | | |
| | Hydroxyl eqivalent | 1,000 | | | 1,000/1,000 | | | 350 | | |
| | Amount (parts) | 13.97 | | | 9.22/5.0 | | | 10.59 | | |
| Surfactant | Kind | — | | | — | | | — | | |
| | Amount (parts) | — | | | — | | | — | | |
| Modifying ratio* | | 0.083 | | | 0.083 | | | 0.105 | | |
| Thickness of surface material (mm) | | — | 0.15 | | — | 0.12 | | — | 0.12 | |
| Class | | Surface test | Surface test | Annexed test | Surface test | Surface test | Annexed test | Surface test | Surface test | Annexed test |
| Heat release value (°C. × min.) | | 267.50 | 0 | 0 | 181.3 | 0 | 0 | 236.3 | 0 | 0 |

TABLE 5(b)-continued

| | | Reference example 11 | Example 12 | Reference example 12 | Example 13 | Reference example 13 | Example 14 |
|---|---|---|---|---|---|---|---|
| JIS A-1321 Combustion test | Fuming factor | 23.7 | 0.9 | 30.3 | 50.4 | 0.9 | 51.3 | 47.6 | 0.6 | 56.7 |
| | Time of lingering flame (sec.) | 0 | 0 | 66 | 0 | 0 | 40 | 0 | 0 | 41 |
| | Crack/deformation | presence/medium | none/medium | — | presence/small | none/small | — | presence/medium | none/small | — |
| | Judgement | unacceptable | acceptable | | unacceptable | acceptable | | unacceptable | acceptable | |

TABLE 5(c)

| | | Reference example 14 | Comparative example 4 | | Reference example 15 | Comparative example 5 | |
|---|---|---|---|---|---|---|---|
| Polyether polyol | Kind | | G-300(7) | | | PP-400/G-300 | |
| | Hydroxyl equivalent | | 100 | | | 200/100 | |
| | Amount (parts) | | 12.81 | | | 5.04/5.55 | |
| Surfactant | Kind | | SH-193 | | | — | |
| | Amount (parts) | | 1.0 | | | — | |
| Modifying ratio* | | | 0.222 | | | 0.143 | |
| Thickness of surface material (mm) | | — | 0.15 | | — | 0.12 | |
| | Class | Surface test | Surface test | Annexed test | Surface test | Surface test | Annexed test |
| JIS A-1321 Combustion test | Heat release value (°C. × min.) | 93.8 | 107.5 | 0 | 187.5 | 258.8 | 0 |
| | Fuming factor | 55.8 | 152.4 | 61.2 | 63.9 | 159.0 | 64.8 |
| | Time of lingering flame (sec.) | 0 | 93 | 42 | 0 | 72 | 50 |
| | Crack/deformation | none/small | presence/large | — | none/medium | presence/large | — |
| | Judgement | unacceptable | unacceptable | | unacceptable | unacceptable | |

Note
*Equivalent ratio of polyol to isocyanate group of organic polyisocyanate
(1): Polypropylene glycol made by Sanyo Kasei Co., Ltd.
(2): Polypropylene glycol, made by Sanyo Kasei Co., Ltd.
(3): Mixed polyethers, made by Sanyo Kasei Co., Ltd.
(4): Polyoxypropylene triol, made by Mitsui Nisso Urethane Co., Ltd.
(5): Polyoxytetramethylene glycol, made by Hodogaya Kagaku Co., Ltd.
(6): Polyoxypropylene triol, made by Takeda Yakuhin Co., Ltd.
(7): Polyoxypropylene triol, made by Asahi Denka Co., Ltd.
(8): Organopolysiloxanepolyalkylene copolymer, made by Toray Silicon Co., Ltd.

EXAMPLES 15, 16

The laminate obtained in Example 3 was subjected to an urethane coating (coating thickness: about 25 microns) and an amide coating (coating thickness: about 7 microns), respectively. The evaluation of the fireproof property was made with respect to these laminate to obtain a result as shown in the following Table 6. As seen from the data of Table 6, these laminates have a fireproof property of Grade 2 incombustibility.

TABLE 6

| | | Example 15 | | Example 16 | |
|---|---|---|---|---|---|
| Kind of coating (color) | | urethane coating (beige) | | amide coating (white) | |
| Coating thickness (micron) | | 25 | | 7 | |
| Thickness of surface material (mm) | | 0.15 | | 0.15 | |
| Thickness of laminate (mm) | | 25 | | 15 | |
| | Class | surface test | annexed test | surface test | annexed test |
| JIS A-1321 Combustion test | Heat release value (°C. × min.) | 0 | 0 | 0 | 0 |
| | Fuming factor | 3.3 | 48.0 | 27.3 | 23.1 |
| | Time of lingering flame (sec.) | 0 | 39 | 29 | 25 |
| | Crack/deformation | none/small | — | none/small | — |
| | Judgement | acceptable | | acceptable | |

EXAMPLES 17, 18

A laminate was manufactured in the same manner as described in Example 3 except that an aluminum foil subjected to an anodic oxidation or an aluminum foil provided with a printed decorative paper was used as the surface material. The evaluation of the fireproof property was made with respect to the resulting laminate to obtain a result as shown in the following Table 7. As seen from the data of Table 7, it has been confirmed that these laminates have a fireproof property of Grade 2 incombustibility.

TABLE 7

|  |  | Example 17 | | Example 18 | |
|---|---|---|---|---|---|
|  |  | anodic oxidation | | sticking of printed decorative paper | |
| Treatment of surface material |  |  | | | |
|  | Class | surface test | annexed test | surface test | annexed test |
| JIS A-1321 Combustion test | Heat release value (°C. × min.) | 0 | 0 | 0 | 26.3 |
|  | Fuming factor | 0.9 | 41.4 | 3.3 | 46.8 |
|  | Time of lingering flame (sec.) | 0 | 47 | 0 | 36 |
|  | Crack/ deformation | none/ small | — | none/ small | — |
|  | Judgement | acceptable | | acceptable | |

What is claimed is:

1. A laminate consisting essentially of (1) an urethane modified polyisocyanurate foam as a single core material and (2) a surface material piled on one or both surfaces of the foam, wherein
    (a) said surface material is an aluminum foil or sheet having a thickness of not less than 0.1 mm, said surface material being piled on said core material through a self-adhesion of said foam;
    (b) said core material is formed by reacting an organic polyisocyanate with a polyol wherein said polyol is a compound having two or more hydroxyl groups at its terminal, and wherein said polyol is selected from the group consisting of the addition product of a polyhydric alcohol with an alkylene oxide, the addition product of an alkanol amine with an alkylene oxide, the addition product of a polyamine with an alkylene oxide, the addition product of phosphoric acid with an alkylene oxide, the addition product of a phenol with an alkylene oxide, the addition product of an intermediate having a phenolic hydroxyl group with an alkylene oxide, a mixture of a polyhydric alcohol and a polyether polyol, and any combination of the above polyols, and wherein said polyol has a hydroxyl equivalent of 200 to 2,000 in an amount of 0.05 to 0.13 equivalent of said polyol to said organic polyisocyanate in the presence of
        (1) an isocyanate trimerization catalyst selected from the group consisting of an alkali metal salt of a carboxylic acid having a carbon number of 2–12 and a combination of a tertiary amino compound and said alkali metal salt;
        (2) a blowing agent; and, optionally
        (3) a foam stabilizer or
        (4) other additives;
    (c) said laminate passes Grade 2 incombustibility (quasi-incombustible material) according to JIS A-1321 combustion test.

2. A laminate as claimed in claim 1, wherein the organic polyisocyanate is an aromatic polyisocyanate.

3. A laminate as claimed in claim 1, wherein the organic polyisocyanate is a mixture of polymethylene polyphenyl isocyanates having the following formula

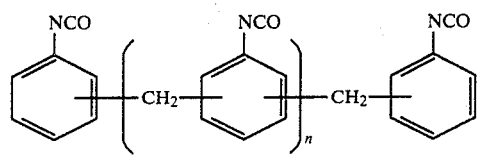

wherein n is zero or an integer of not less than 1.

4. A laminate as claimed in claim 1, wherein the polyol is a polyether polyol.

5. A laminate as claimed in claim 4, wherein the polyether polyol is an addition product of a compound having an active hydrogen with an alkylene oxide.

6. A laminate as claimed in claim 5, wherein the compound having an active hydrogen is selected from the group consisting of ethylene glycol, glycerine, trimethylol propane, pentaerythritol, hexane triol, methyl glucoside, sorbitol, sucrose, diethanol amine, triethanol amine, diethylene triamine, tolylene diamine, phosphoric acid and bisphenol A.

7. A laminate as claimed in claim 5, wherein the alkylene oxide is ethylene oxide or propylene oxide.

8. A laminate as claimed in claim 1, wherein the alkali metal salt of carboxylic acid is selected from potassium acetate, potassium propionate, potassium caprylate, potassium 2-ethyl hexanoate, potassium adipate and sodium benzoate.

9. A laminate as claimed in claim 1, wherein the tertiary amino compound is selected from N,N', N''-tris(-dialkylaminoalkyl)-sym-hexahydrotriazine, 2,4,6-tris(-dimethylaminomethyl) phenol, 1,8-diaza-bicyclo(5,4,0)-undecene-7, triethylamine, dimethyl ethanolamine, tetramethyl ethylenediamine and triethylene diamine.

10. A laminate as claimed in claim 1, wherein the isocyanate trimerization catalyst is used in an amount of 0.5 to 10% by weight per the organic polyisocyanate.

11. A laminate as claimed in claim 1, wherein the blowing agent is a low-boiling inert solvent.

12. A laminate as claimed in claim 1, wherein the blowing agent is trichloromonofluoromethane.

13. A laminate as claimed in claim 1, wherein the aluminum foil or sheet is subjected to an anodic oxidation, a coating or a sticking of printed decorative paper.

* * * * *